M. P. HOLMES.
TRUCK.
APPLICATION FILED DEC. 11, 1918. RENEWED FEB. 3, 1921.
1,378,815.
Patented May 17, 1921.
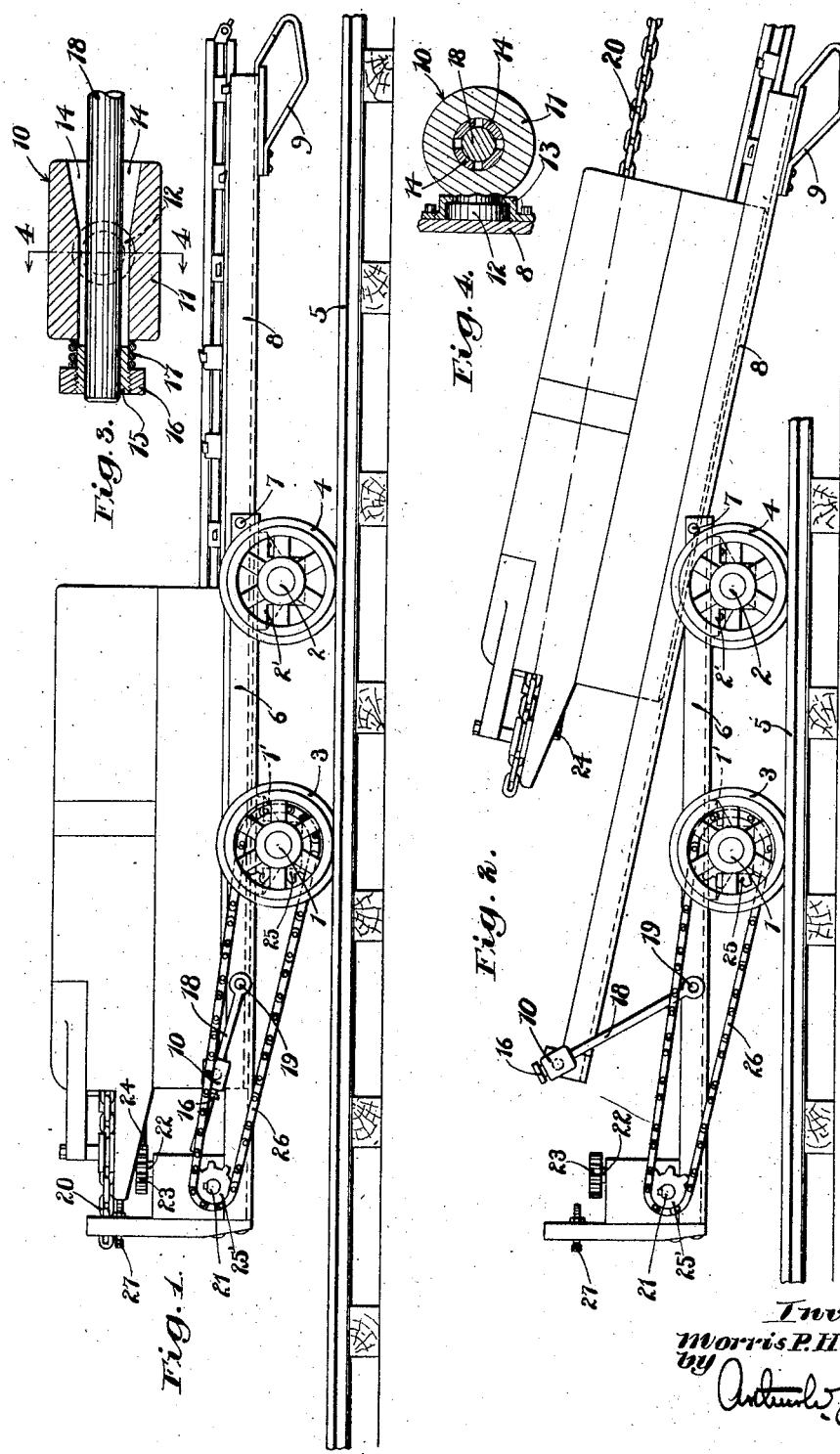

UNITED STATES PATENT OFFICE.

MORRIS P. HOLMES, OF CLAREMONT, NEW HAMPSHIRE, ASSIGNOR TO SULLIVAN MACHINERY COMPANY, A CORPORATION OF MASSACHUSETTS.

TRUCK.

1,378,815.  Specification of Letters Patent.  Patented May 17, 1921.

Application filed December 11, 1918, Serial No. 266,319. Renewed February 3, 1921. Serial No. 442,328.

*To all whom it may concern:*

Be it known that I, MORRIS P. HOLMES, a citizen of the United States, residing at Claremont, in the county of Sullivan and State of New Hampshire, have invented certain new and useful Improvements in Trucks, of which the following is a full, clear, and exact specification.

My invention relates to trucks, and more particularly to mining machine trucks, the object of the present invention being to provide an automatic means for holding a solid frame mining machine truck in a tilted position, after the mining machine has been unloaded therefrom, so that the truck is in a position to receive the mining machine when it is desired to reload the machine onto the truck.

Heretofore it has been the practice to use a solid frame truck so constructed that, when the front end of the truck is depressed by the weight of the mining machine, the rear end is elevated, with the result that when the machine slides off from the truck the rear end thereof falls suddenly, breaking the rear wheels or the cable reel supports, or derailing the truck. A few jack-knife trucks have been used in which the frame is in sections pivotally connected in such a manner that both ends of the truck are depressed during the unloading operation and, after the mining machine has been unloaded, the truck ends and wheels contact with the track or mine floor. This last construction is open to objection in that the pivoted frame members do not make as rigid and substantial a truck as the solid frame, and in that the rear end strikes the track and loosens the reel supports.

These defects I have overcome by my present invention, which will be best understood by reference to the accompanying drawings in which I have shown for purposes of illustration one embodiment which my invention may assume in practice.

In these drawings,—

Figure 1 is a side elevation of my improved truck with the mining machine thereon in loaded position.

Fig. 2 is a side elevation of the truck with the mining machine unloading.

Fig. 3 is an enlarged longitudinal sectional view of the clutch.

Fig. 4 is a transverse sectional view on the line 4—4 of Fig. 3.

Referring to the drawings, I have there shown for the purpose of illustrating the principal features of the invention, a four-wheel truck having a plurality of axles 1 and 2, carrying wheels 3 and 4 adapted to run on a track 5. A small truck frame 6 is mounted on the axles 1 and 2 by means of axle boxes 1', 2' in such a manner that this wheeled frame forms a truck unit. This frame 6 extends for some distance to the rear of the rear wheel 3, but extends but a short distance in front of the front wheel 4.

Pivotally mounted, as shown at 7, on the front end of the small or supplemental truck frame 6, is a larger or main truck frame or body 8, which extends rearwardly to a point adjacent the other end of the frame 6, extends in front of the wheeled unit for nearly an equal distance, and carries on this end a loading shoe 9 which limits the swinging or tilting movement of the main frame or body 8 on its pivot 7. This main frame is preferably formed as a single unit adapted to receive a mining machine in the position shown in Fig. 1, which is termed the "loaded" position, and is also adapted to tilt, as is shown in Fig. 2, under the weight of the mining machine to permit the loading or unloading of the latter from the truck.

It is essential to the proper operation of the truck that the main frame or body remain in an inclined or tilted position after the machine has been unloaded, in order that the machine may be readily reloaded onto the truck. For this purpose I have mounted, on the wheeled unit and the tilting body, coöperating means to normally retain the body tilted after the mining machine has been unloaded therefrom. This means consists of a clutch member 10 preferably mounted on the main frame 8, as shown, and coöperating with a rod 18 pivotally mounted, as by a bolt 19, on the small wheeled frame 6. The clutch 10 comprises a sleeve 11 (see Fig. 3) having formed thereon a boss 12 by which this sleeve is pivotally held to the frame 8, as by a flanged sleeve 13 (Fig. 4). The sleeve 11 is preferably centrally bored throughout its length, the greater part of the bore being substantially cylindrical, and the rest of the bore being conical with the base of the cone opening outward to constitute a flaring mouth. Mounted in this sleeve is a set of clutch jaws 14, preferably formed by splitting or sawing a hollow member or sleeve for a part of its length to permit the jaws to be flexed, the unsplit part 15 of the inner sleeve serving to retain the jaws in their proper relative positions. To normally retain the sleeve in clutching position, and to prevent the disengagement of the clutch, I have provided a collar 16 which is preferably threaded onto the sleeve end 15 to form an abutment for one end of a coiled spring 17, which encircles the sleeve end 15 and abuts against one end of the sleeve 11, said collar serving also as a means for varying the tension of the spring.

The clutch does not tightly engage the rod when the left hand or rear end of the main truck frame or body is moving upwardly, thus carrying the clutch upwardly on the rod, but when the rear end of the truck body tends to approach the small frame, the clutch jaws are forced against the rod and tend to grip the latter to prevent a further movement in that direction. The angle of the coned surfaces of the clutch and the tension of the spring 17, are so regulated that the clutch will prevent a movement of the rear end of the mining machine frame downward under the weight of this frame, but will permit this movement under the weight of the frame and mining machine.

In the use of this improved construction, it will be readily understood that when the mining machine is being unloaded from the truck by means of the usual feed chain 20, the weight of the machine will tilt the frame 8 on the front end of the frame 6 until the shoe 9 strikes the mine floor, when the machine may be run off. During this tilting of the solid frame 8, all the wheels remain on the track, the tilting movement being confined entirely to the truck body. A return movement of the frame to a horizontal position is prevented by the action of the clutch on the tie rod until the mining machine is reloaded onto the truck, when the weight of the mining machine will force the clutch as the center of gravity of the machine passes to the rear of the pivot. The clutch jaws 14, however, do not release the rod but bear on it frictionally and tend to check the movement of the rear end of the frame downward so as to dampen the motion of the main frame. This clutch serves the double purpose of holding the frame in a tilted position when the latter is in unloading position, and giving a dashpot reaction to the movement of the truck frame when the latter is being tilted from loading to loaded position. It will be noted that the clutch mechanism shown is of the universal type, being operative at any angular position of the frame members.

As is usual in mining machine trucks, I have provided means for propelling the truck along the track 5, and in the form of my improvement herein shown this means consists of horizontal and vertical shafts 21, 22 connected by worm or other suitable gearing (not shown), the shaft 22 being driven by the mining machine motor through cog wheels 23, 24 in a well known manner, and the horizontal shaft 21 being provided with a sprocket 25' connected by a chain 26 with a coöperating sprocket 25 on the rear axle 1. A set screw 27 limits the rearward movement of the mining machine on the main truck frame to prevent injury to the gears 23, 24. As is clearly shown in Fig. 1, when the mining machine is in loaded position, a positive driving connection is formed from the motor driven gear 24 through the shafting and chain to the rear wheels 3 for propelling the car in either direction.

By this construction it is seen that I have produced a mining machine truck wherein the wheeled unit is very strongly and substantially made, and wherein the main truck frame is pivotally connected to one end thereof and may be held in any of a plurality of tilted positions by a simple clutch mechanism which also serves as braking means to check the downward movement of the rear end of the truck body to prevent the latter's striking the wheeled truck with such a force as to break or rack the latter.

While I have in this application specifically described two forms which my invention may assume in practice, it is to be understood that these forms of the same are used for purposes of illustration and that the invention may be modified or embodied in various other forms without departing from its spirit.

What I claim as new and desire to secure by Letters Patent is:

1. In a mining machine truck, a wheeled frame having front and rear wheels, a machine carrying body pivoted at the front end thereof and tiltable by a mining machine movable thereover, and friction means mounted on said frame and body for retaining said body in a tilted position.

2. In a mining machine truck, a wheeled frame having front and rear wheels, a machine carrying body pivoted at the front end thereof and tiltable by a mining machine movable thereover, and universal clutch means mounted on said frame and body for retaining said body in a tilted position.

3. In a mining machine truck, a wheeled frame having front and rear wheels, a machine carrying body pivoted at the front end thereof and tiltable by a mining machine movable thereover, and friction means mounted on said frame and body for retaining said body in a tilted position when the latter is at any one of a plurality of angles to said frame.

4. In a mining machine truck, a wheeled frame having front and rear wheels, a machine carrying body pivoted at the front end thereof and tiltable by a mining machine movable thereover, and clutch means comprising elements mounted on said frame and body for retaining said body in a tilted position when the latter is at any one of a plurality of angles to said frame.

5. In a mining machine truck, a wheeled frame having front and rear wheels, a machine carrying body pivoted at the front end thereof and tiltable by a mining machine movable thereover, and friction means mounted on said frame and body adjacent the rear ends thereof for retaining said body in a tilted position.

6. In a mining machine truck, a wheeled frame having front and rear wheels, a machine carrying body pivoted at the front end thereof and tiltable by a mining machine movable thereover, and clutch means comprising elements mounted on said frame and body adjacent the rear ends thereof for retaining said body in a tilted position.

7. In a mining machine truck, a wheeled frame having front and rear wheels, a machine carrying body pivoted at the front end thereof and tiltable by a mining machine movable thereover, and clutch means mounted on said frame and body for retaining the latter in a tilted position, said clutch being adapted to be forced by said machine.

8. In a mining machine truck, a wheeled frame having front and rear wheels, a machine carrying body pivoted at the front end thereof and tiltable by a mining machine movable thereover, truck driving mechanism at the opposite end of said frame, and clutch means mounted on said frame and body for retaining the latter in a tilted position wholly controlled by said machine.

9. In a mining machine truck, a wheeled frame having front and rear wheels, a machine carrying body pivoted at the front end thereof and tiltable by a mining machine movable thereover, a clutch mounted on said body, and a rod mounted on said frame and coöperating with said clutch for retaining the body in a tilted position.

10. In a mining machine truck, a wheeled frame having front and rear wheels, a machine carrying body pivoted at the front end thereof and tiltable by a mining machine movable thereover, a clutch mounted on said body, and a rod mounted on said frame and coöperating with said clutch for retaining the body in a tilted position, said clutch being operative to support the body in a tilted position but inoperative to support the body and machine in a tilted position.

11. In a mining machine truck, a wheeled frame, truck driving mechanism thereon, a machine carrying body pivoted at the front end thereof and tiltable by a mining machine movable thereover, a clutch mounted on said body, and a rod mounted on said frame and coöperating with said clutch for retaining the body in a tilted position, said clutch being operative to support the body in a tilted position but inoperative to support the body and machine in a tilted position.

12. In a mining machine truck, a wheeled frame having front and rear wheels, a machine carrying body pivoted at the front end thereof and tiltable by a mining machine movable thereover, an adjustable clutch mounted on said body, and a rod mounted on said frame and coöperating with said clutch for retaining the body in a tilted position, said clutch being operative to support the body in a tilted position but inoperative to support the body and machine in a tilted position.

13. In a mining machine truck, a horizontally disposed wheeled frame, a machine carrying body pivoted thereon and tiltable by a machine moving thereover, and means operatively connected between said frame and said body when the latter is in tilted position for retarding the lowering movement of said body upon said frame.

14. In a mining machine truck, a horizontally disposed wheeled frame, a machine carrying body pivoted thereon and tiltable by a machine moving thereover, and means operatively connected between said frame and said body for holding the latter in elevated position and retarding the lowering movement of the same upon said frame.

15. In a mining machine truck, a horizontally disposed wheeled frame, truck driving mechanism thereon, a machine carrying body pivoted on said frame and tiltable by a machine movable thereover, and means operatively connected between said frame and said body for supporting the latter in tilted position and retarding the lowering movement of the same upon said frame.

16. In a mining machine truck, a horizontally disposed wheeled frame, a machine carrying body pivoted thereon and tiltable by a machine movable thereover, a clutch member swiveled on one of said elements, and a coöperating clutch member pivoted on the other element, said coöperating clutch members being operatively connected between said frame and the rear end of said body.

17. In a mining machine truck, a horizontally disposed wheeled frame, a machine carrying body pivoted thereon and tiltable by a machine movable thereover, a clutch member swiveled on the rear end of said tiltable machine carrying body, and a clutch rod slidable in said clutch and pivotally connected to said frame at a point at one side of the path of movement of said clutch when said body is tilted.

18. In a mining machine truck, a wheeled frame having front and rear wheels, a machine carrying body pivoted at the front end thereof and tiltable by a mining machine movable thereover, truck driving mechanism at the opposite end of said wheeled frame, and clutch means mounted on said frame and body for retaining said body in a tilted position when the latter is at any one of a plurality of angles to said frame.

In testimony whereof I affix my signature.

MORRIS P. HOLMES.